United States Patent [19]

Murakami

[11] Patent Number: 5,550,637
[45] Date of Patent: Aug. 27, 1996

[54] POWER-SAVING PRINTER WHICH CONTROLS FIXING DEVICE BASED ON PRINT DATA PRESENCE

[75] Inventor: Masahiro Murakami, Hekinan, Japan

[73] Assignee: Brother Kogyo Kabushiki Kaisha, Nagoya, Japan

[21] Appl. No.: 194,612

[22] Filed: Feb. 10, 1994

[30] Foreign Application Priority Data

Mar. 26, 1993 [JP] Japan .................................. 5-068498

[51] Int. Cl.⁶ .......................... H04N 1/23; H04N 1/29; G03G 21/00; G03G 15/20
[52] U.S. Cl. .................... 358/296; 358/300; 358/401; 355/208; 355/282; 355/285; 219/216
[58] Field of Search ...................... 358/296, 300, 358/400, 401, 406, 434, 437–439, 468; 355/208, 282, 285; 395/113, 114; 219/216

[56] References Cited

U.S. PATENT DOCUMENTS

| | | | |
|---|---|---|---|
| 4,006,985 | 2/1977 | Hutner ........................... | 219/216 X |
| 4,497,568 | 2/1985 | Komiya et al. ................. | 355/208 |
| 4,642,448 | 2/1987 | Shigemura et al. ............. | 219/216 |
| 5,241,134 | 8/1993 | Nagasaka ........................ | 355/285 |
| 5,315,350 | 5/1994 | Hirobe et al. ................... | 355/208 |
| 5,321,478 | 6/1994 | Nakamura et al. ............. | 355/285 |
| 5,325,520 | 6/1994 | Manabe .......................... | 358/437 |
| 5,457,516 | 10/1995 | Kim ............................... | 355/208 |

Primary Examiner—Peter S. Wong
Assistant Examiner—Eric Frahm
Attorney, Agent, or Firm—Oliff & Berridge

[57] ABSTRACT

A printer makes a decision as to whether data has been received from a host computer and whether the received data is either a control code or print data. When data is not received from the host computer or the received data is a control code, which is related to a print non-executing process, a CPU gives an instruction to a power source, when such a state continues for a predetermined time interval, to thereby bring a fixing device to a power-saved state wherein the power supplied to the fixing device is controlled. When the received data is print data for a print executing process, the CPU instructs the power source to supply the power to the fixing device so that the fixing device is reset to a fixing-operation enable state. Thus, the supply of the power to the fixing device is switched according to the kind of data inputted from the host computer so as to reduce the total power consumed during operation.

20 Claims, 3 Drawing Sheets

Fig.3

| FUNCTION | CONTROL CODE |
|---|---|
| LINE FEED | LF |
| FORM FEED | FF |
| PAGE LENGTH | ESC&ℓ#P |
| TOP MARGIN | ESC&ℓ#E |
| LINE SPACING | ESC&ℓ#D |
| CHARACTER PITCH | ESC&k#H |
| ⁓ | ⁓ |
| PAPER SIZE | ESC&ℓ#A |

13A

POWER-SAVING PRINTER WHICH CONTROLS FIXING DEVICE BASED ON PRINT DATA PRESENCE

BACKGROUND OF THE INVENTION

1. Field of the Invention

The invention relates to a technique addressed to the consumption of power, which is correlated to the control of heat of a fixing device provided within a printer.

2. Description of the Related Art

A laser printer has heretofore been known wherein an electrostatic latent image is formed on a photosensitive drum and developed by toner. The developed toner image is transferred onto a sheet of printing paper and then supplied to a fixing device, maintained at a predetermined temperature, where the transferred image is fixed on a sheet of paper by heating.

A heat roller of the fixing device is provided with a heater. Further, the heat roller is heated by supplying power to the heater. However, the maintenance of the temperature of the heat roller used in the fixing device, at a fixable predetermined temperature, is inefficient in terms of power consumption.

When data is not received from a receiving means within a predetermined time interval, control for restraining the supply of power to the fixing device or stopping its supply, to thereby reduce the power being consumed, is performed. While the power being consumed is still in a controlled state (hereinafter called a "power-saved state"), the fixing device is reduced in temperature. Therefore, when the printing is performed under this state, a failure in printing occurs. Thus, the supply of the power to the fixing device is resumed upon printing and the temperature of the fixing device must be controlled so as to return to the predetermined temperature. In this case, however, the time for resuming the supply of the power to the fixing device has been established, up to now, as standard at the time when a data receiving means receives data from a host computer.

However, the received data are not necessarily limited to print data alone. The received data include, for example, control data and data about the shape of each font used for printing. Even when such data, irrelevant to an actual print executing process, are received, the supply of the power to the fixing device is resumed and the temperature of the fixing device is brought to the predetermined high temperature. Therefore, the prior art printers do not efficiently control the power to be consumed.

When the temperature of the fixing device is changed from the low temperature, for saving power, to the predetermined high temperature, a large amount of power is required. Therefore, a problem arises in the excessive response to all received data, thereby frequently controlling the temperature of the fixing device and increasing the power consumed.

SUMMARY OF THE INVENTION

The invention has been made to solve the above problems. It is therefore an object of the invention to provide a printer wherein power is supplied to a fixing device in such a manner that the temperature of the fixing device is brought to a predetermined fixing temperature only when data for actually being printed is received, thereby reducing the power to be consumed.

According to one aspect of the invention for achieving the above object, there is provided a printer comprising data receiving means for receiving transmitted data therein; a fixing device, the temperature of which is varied according to the supply of power to the fixing device from a power source, for fixing an image on a sheet of paper based on the transmitted data; determining means for determining whether the transmitted data requires a print executing process; first power controlling means for controlling the supply of the power to the fixing device in such a manner that the temperature of the fixing device is brought to a fixable predetermined temperature when it is determined by the determining means that the transmitted data requires the print executing process; and second power controlling means for controlling the supply of power to the fixing device in such a manner that the temperature of the fixing device is brought to a temperature lower than the fixable predetermined temperature when it is determined by the determining means that the transmitted data requires a print non-executing process.

According to the printer of the invention having the above-described structure, the data receiving means receives the transmitted data. The determining means determines whether or not the data received by the data receiving means represents a data print executing process. If it is determined by the determining means that the received data represents the print executing process, the first power controlling means controls the supply of power to the fixing device in such a manner that the temperature of the fixing device is brought to the fixable predetermined temperature. If it is determined by the determining means that the received data represents a non-printing process, the second power controlling means controls the supply of the power to the fixing device in such a way that the temperature of the fixing device is brought to the temperature lower than the predetermined fixing temperature.

According to the printer of the invention as is apparent from the above description, the power is supplied to the fixing device on the basis of an analysis of the received data and, then, the fixing device is brought to the appropriate one of the predetermined temperatures. Therefore, the power is consumed at highest efficiency.

The above and other objects, features and advantages of the invention will become apparent from the following description and the appended claims, taken in conjunction with the accompanying drawings in which a preferred embodiment of the invention is shown by way of illustrative example.

BRIEF DESCRIPTION OF THE DRAWINGS

A preferred embodiment of the invention will be described in detail with reference to the following figures, in which:

FIG. 3 is a brief schematic diagram for explaining the contents of a table data.

DETAILED DESCRIPTION OF THE PREFERRED EMBODIMENTS

A preferred embodiment according to the invention will hereinafter be described in detail with reference to the accompanying drawings.

Figure 1:
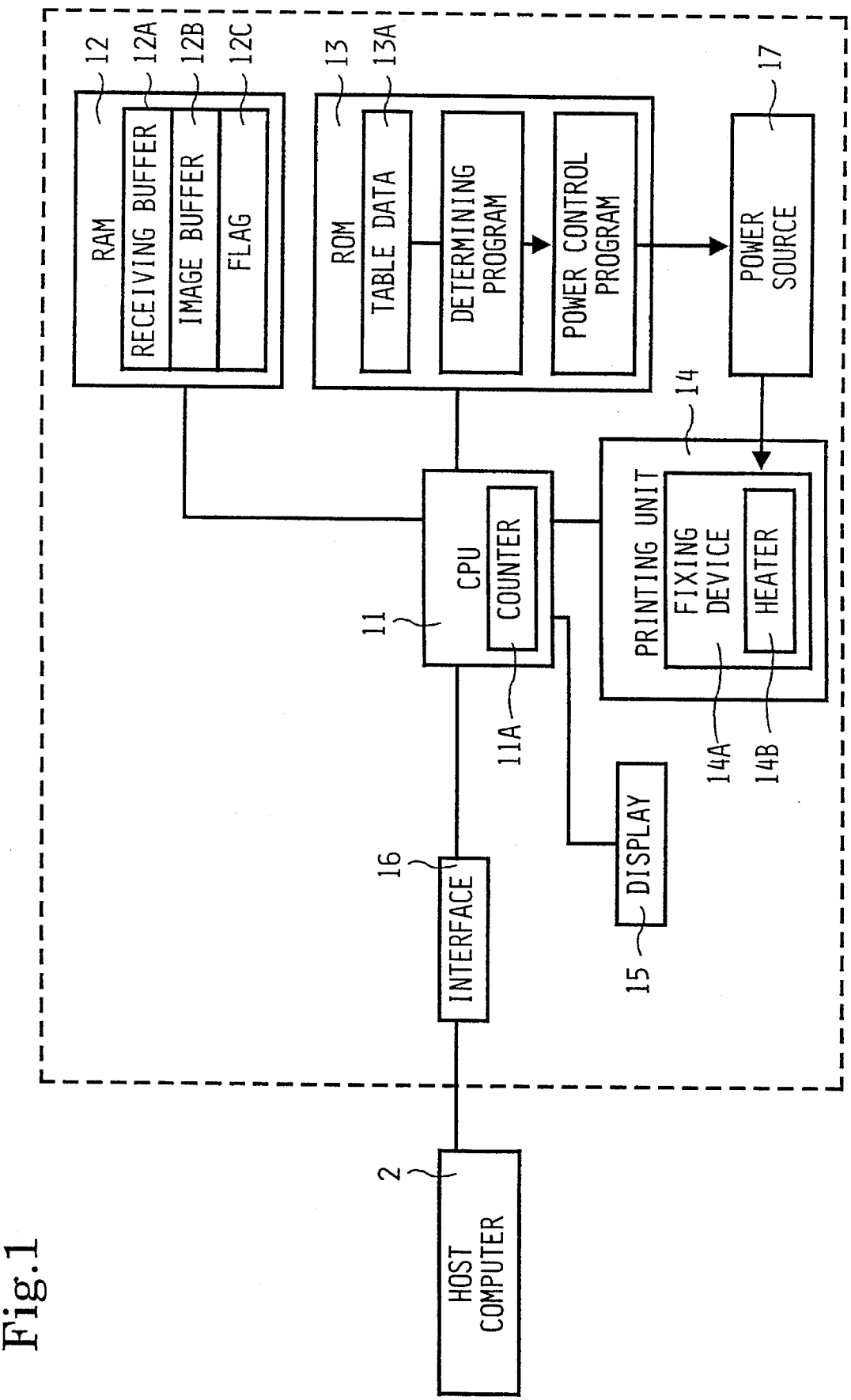
FIG. 1 is a block diagram showing the structure of a printer.

A printer 1, as shown in FIG. 1, in the present embodiment comprises a CPU (central processing unit) 11, a RAM 12, a ROM 13, a printing unit 14, a display 15, an interface 16, and a power source 17. Further, the printer 1 receives data from a host computer 2 so as to perform a printing operation.

The CPU 11 has a counter 11A that uses a clock incorporated therein. A value counted by the counter 11A is decremented from a predetermined value in synchronism with the clock.

The RAM 12 has a receiving buffer 12A, an image buffer 12B and a flag 12C. The receiving buffer 12A stores therein the data received from the host computer 2 via the interface 16. The image buffer 12B stores therein image data obtained by developing print data of the received data in the form of a bit pattern. The flag 12C shows a state of the supply of power to a fixing device 14A. That is, when the supply of the power to the fixing device 14A is restrained or controlled (this state is called a "power-saved state"), the flag 12C is set to "1." In the case of a power-non-saved state, the flag 12C is set to "0."

The ROM 13 stores therein a program for deciding or determining the kind of data received, a program for spreading or developing the received print data in the form of a bit pattern, a program for the control of the printing unit 14 and a program for controlling the supply of power to the fixing device 14A. Further, the ROM 13 is electrically connected to the CPU 11.

The interface 16 transmits data to the host computer 2 and receives it therefrom.

The printing unit 14 includes the fixing device 14A and reads the print data from the image buffer 12B so as to perform a printing operation. The fixing device 14A fixes a toner image transferred onto a sheet of printing paper using the heat generated by a heater 14B.

The display 15 displays the state of the printer 1 thereon and is electrically connected to the CPU 11.

The power source 17 supplies power to the heater 14B which constitutes a part of the fixing device 14. However, the amount of power supplied to the heater 14B is controlled in accordance with the power supply program stored in the ROM 13. The temperature of the fixing device 14A varies depending on the amount of power supplied to the fixing device 14A.

Each of the control codes sent from the host computer 2 has been set or fixed and simplified in advance in terms of its meaning to determine the data delivered from the host computer 2. Further, each control code has been stored in the ROM 13 as table data 13A as shown in FIG. 3. The CPU 11 compares the data received from the host computer 2 with data found in the table data 13A and decides, or detects, whether they coincide with each other. Then, the CPU 11 determines or identifies, based on the result of the detection, whether the data represents a control code.

When, for example, a font is downloaded or a control code and data for its control are sent from the host computer 2, data of a predetermined number of bytes, which follows the control code, are transmitted inclusive of the contents to the effect that the data is data about the shape of the font, within the control code in order to distinguish between the data for the control of the control code and the print data. Thus, the data for the control of the control code is distinguished from the print data without any confusion therebetween by analyzing the control code.

By distinguishing the print data, the control code and the data for control of the control code as described above, a decision is made as to whether the host computer 2 is required to execute a print executing process.

Figure 2:
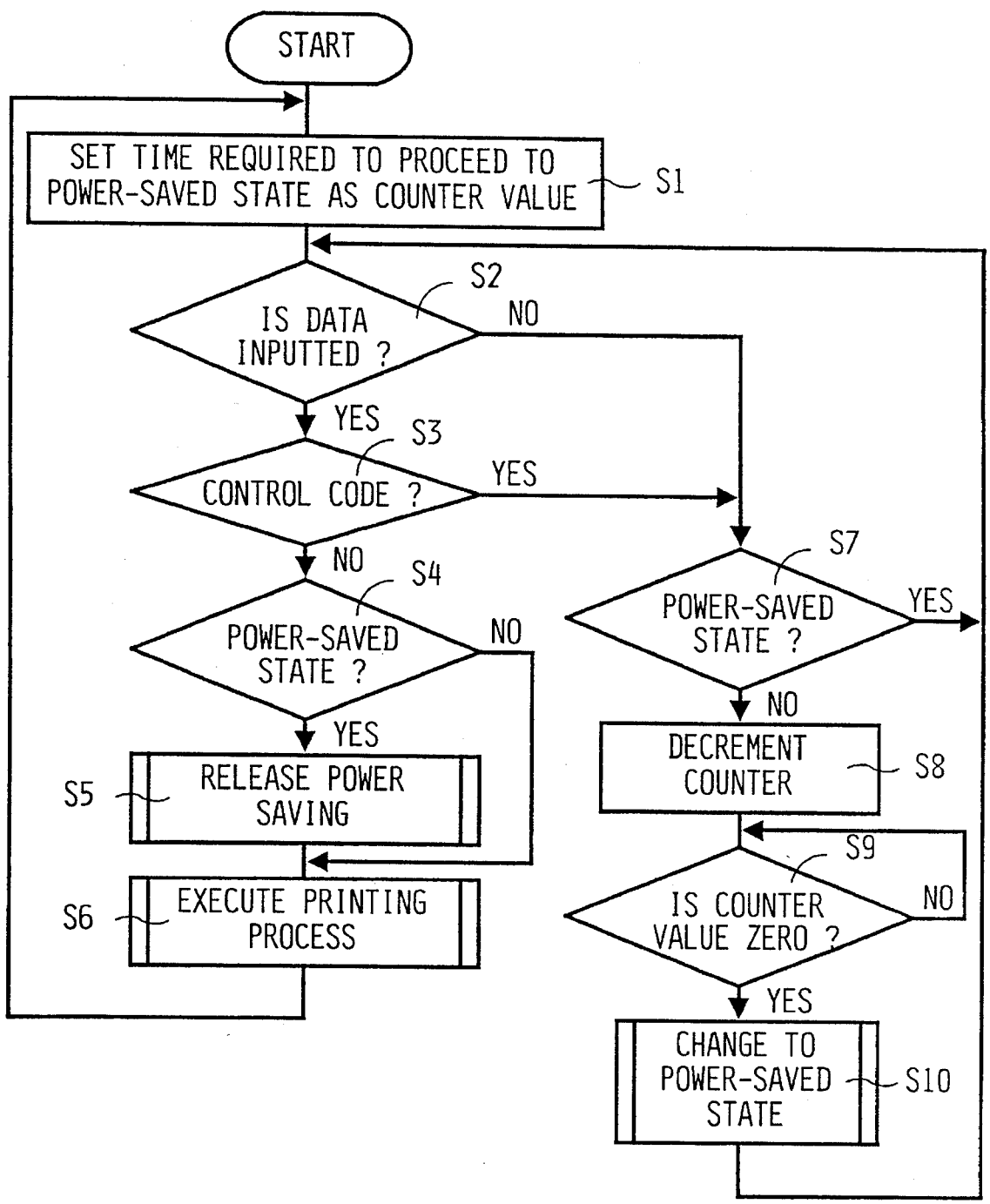
FIG. 2 is a flowchart of a sequence of a printing operation.

Operation of the printer 1 in the present embodiment will be described below referring to the flowchart of FIG. 2 for explaining its operation. Symbol Si (where i=1, 2, 3, . . . ) represent steps.

The printer 1, whose printing operation has been completed, sets a given time interval to pass prior to proceeding or changing to the power-saved state as a counter value (S1). The set time interval may be either a predetermined time interval or a time interval set by a user.

When the host computer 2 transmits data, the CPU 11 detects it via the interface 16 (i.e., the answer in S2 is yes). The received data is first stored in the receiving buffer 12A of the RAM 12. The CPU 11 then compares the received data with the table data 13A stored in the ROM 13, shown in FIG. 3, and determines, based on the result of the comparison, whether the data is of either control code or print data (S3).

If it is determined in S3 that the received data does not coincide with data in the table data 13A and is, therefore, print data (i.e., if the answer in S3 is No), the flag 12C is confirmed and it is determined whether the fixing device 14A is in the power-saved state at present (S4).

If it is decided in S4 that the fixing device 14A is in the power-saved state (i.e., if the answer in S4 is Yes), the CPU 11 gives an instruction to the power source 17 in accordance with a first power control program stored in the ROM 13 to thereby supply the power to the fixing device 14A so that the temperature of the fixing device 14A is raised up to a fixing temperature of 170° C. (S5). If it is determined in S4 that the fixing device 14A is not in the power-saved state and is maintained at the fixing temperature of 170° C. (i.e., if the answer in S4 is No), the supply of the power to the fixing device 14A is maintained as it is.

When the fixing device 14A is at the fixing temperature of 170° C., a printing process is started (S6). Then, the print data stored in the receiving buffer 12A are successively developed into dot patterns suitable for printing and stored in the image buffer 12B. When the image data stored in the image buffer 12B reach a predetermined amount, the CPU 11 reads the image data and supplies it to the printing unit 14 where the printing process is carried out.

After the printing process has been completed, the routine is returned to S1, where the counter value is set to a predetermined time interval and data to be delivered next is placed in a waiting state.

If it is determined in S2 that print data has not been sent from the host computer 2 (i.e., if the answer in S2 is No) or if it is decided in S3 that a control code and the data for the control of the control code have been received (i.e., if the answer in S3 is Yes), the flag 12C is first confirmed and the state of the fixing device 14A is determined at this time (S7).

If it is determined in S7 that the fixing device 14A is in the power-saved state (i.e., if the answer in S7 is Yes), the routine procedure is returned to S2 where the present power-saved state is maintained as it is until print data is received from the host computer 2.

If it is determined in S7 that the fixing device 14A is not in the power-saved state (i.e., if the answer in S7 is No), the value of the counter 11A is decremented with the clock in the CPU 11 set as a standard. If it is determined in S9 that the counter value is not zero, the processing is placed in a waiting state (i.e., the answer in S9 is No) until the counter value reaches zero. If it is determined in S9 that the counter value has reached zero (i.e., if the answer in S9 is Yes), the CPU 11 instructs the power source 17, in accordance with a second power control program stored in the ROM 13, to control the supply of power to the fixing device 14A. Thereafter, the fixing device 14A is brought or changed to the power-saved state. After the fixing device 14A has been brought to the power-saved state, the routine procedure is returned to S2 where the received data is judged as described above and the present power-saved state is maintained as it is until print data is received.

Incidentally, the invention is not necessarily limited to the aforementioned embodiment. It will be apparent to those skilled in the art that many changes and modifications can be made without departing from the spirit or scope of the invention as set forth herein.

The present embodiment shows, for example, a case where the supply of power to the fixing device 14A is controlled as the power-saved state and the temperature of the fixing device 14A is maintained at a predetermined temperature lower than a fixing temperature. However, the supply of the power to the fixing device 14A may be completely shut off rather than be maintained at the predetermined lower temperature.

What is claimed is:

1. A printer, comprising:

data receiving means for receiving transmitted data;

a fixing device, whose temperature is varied according to the supply of power to said fixing device from a power source, for fixing an image on paper based on the transmitted data;

determining means for determining whether the transmitted data requires a print executing process;

first power controlling means for controlling the supply of the power to said fixing device in such a manner that the temperature of said fixing device is brought to a fixable predetermined temperature when it is determined by said determining means that the transmitted data requires said print executing process; and second power controlling means for controlling the supply of the power to said fixing device in such a manner that the temperature of said fixing device is brought to a temperature lower than the fixable predetermined temperature when it is determined by said determining means that the transmitted data requires a print non-executing process.

2. The printer according to claim 1, wherein said determining means comprises:

data detecting means for detecting whether data has been transmitted;

control code storing means for storing therein, in a data table, control codes corresponding to data indicative of a print non-executing processes; and data identifying means for comparing the data received by said data receiving means with data in the data table and identifying whether the received data coincides with a control code stored in said control code storing means.

3. The printer according to claim 2, wherein when the received data is identified as control data, said determining means determines the transmitted data requires the print non-executing process.

4. A method of controlling a heating element in a printer, comprising the steps of:

establishing a time for going from a heated state to a power saved state following printing;

receiving data from an external source;

judging whether the data is data to be printed;

identifying a power state; and adjusting the power state based upon results of the judging and identifying steps.

5. The method according to claim 4, wherein the step of establishing a time comprises an operator inputting a delay time.

6. The method according to claim 4, wherein when the step of identifying the power state determines the power state is the power-saved state, data is received, and the judging step determines the data is not to be printed, further comprising the step of maintaining the power-saved state.

7. The method according to claim 4, wherein when the step of identifying the power state determines the power state is the heated state, no data is received or the data received is judged at the judging step to be data that is not printed, further comprising the steps of:

decrementing a counter from the time established in said establishing a time step; and checking the counter to see if the time has reached zero.

8. The method according to claim 7, wherein said adjusting step adjusts the power state from the heated state to the power saved state when the counter reaches zero.

9. The method according to claim 4, wherein when the step of identifying the power state determines the power state is the power saved state and the data received is identified as print data, the step of adjusting adjusts the power state to the heated state for printing.

10. The method according to claim 4, wherein when the step of identifying the power state determines the power state is the heated state and the data received is identified as print data, the step of adjusting maintains the power state as the heated state.

11. A printer, comprising:

data receiving means for receiving transmitted data;

a fixing device for fixing an image on a recording medium;

power supplying means for supplying power to said fixing device;

judging means for judging whether the transmitted data requires a print executing process; and adjusting means for adjusting the supply of the power by said power supplying means based on the result of the judgment by said judging means.

12. The printer as claimed in claim 11, wherein a temperature of said fixing device is varied according to the supply of the power by said power supplying means.

13. The printer as claimed in claim 12, wherein said adjusting means adjusts the supply of the power by said power supplying means such that the temperature of said fixing device is brought to a temperature lower than a fixable predetermined temperature where the image can be fixed on the recording medium when said judging means judges that the transmitted data does not require the print executing process.

14. The printer as claimed in claim 13, wherein said adjusting means saves the supply of the power by said power supplying means.

15. The printer as claimed in claim 13, wherein said adjusting means adjusts the supply of the power by said power supplying means such that the temperature of said fixing device is brought to the fixable predetermined temperature when said judging means judges the transmitted data requires the print executing process.

16. The printer as claimed in claim 13, further comprising a control code table for storing a control code that does not require the print executing process, wherein said judging means compares the transmitted data with the control code stored in said control code table.

17. The printer as claimed in claim 16, wherein said adjusting means adjusts the supply of the power when said judging means judges that the transmitted data is the control code.

18. The printer as claimed in claim 13, further comprising a counter for counting a time at which the temperature of said fixing device is brought to the temperature lower than the fixable predetermined temperature.

19. The printer as claimed in claim 18, wherein said adjusting means saves the supply of the power by said power supplying means when the counter reaches zero.

20. The printer as claimed in claim 18, wherein said adjusting means shuts off the supply of the power by said power supplying means when the counter reaches zero.

* * * * *